United States Patent [19]
Sherritt

[11] 3,954,189
[45] May 4, 1976

[54] MATERIAL HANDLING APPARATUS

[76] Inventor: Gail Sherritt, 6121 S. Union Road, Miamisburg, Ohio 45432

[22] Filed: Feb. 14, 1975

[21] Appl. No.: 550,034

Related U.S. Application Data

[63] Continuation of Ser. No. 403,382, Oct. 4, 1973, abandoned.

[52] U.S. Cl. .............................................. 214/1 H
[51] Int. Cl.² ........................................... B25J 5/06
[58] Field of Search ................. 214/1 H, 1 S, 1 SW, 214/502, 508, 700, 149, 85.5, 1 R

[56] References Cited
UNITED STATES PATENTS
3,335,886   8/1967   Larson ............................... 214/502

*Primary Examiner*—Stanley H. Tollberg
*Attorney, Agent, or Firm*—Jerome P. Bloom

[57] ABSTRACT

Material handling apparatus for use in loading large heavy and/or cumbersome articles such as concrete slabs, wall segments or other articles of like configuration on a mobile vehicle and transporting and installing the same comprising a frame-work supporting an overhead platform mounting article loading means and incorporating means for laterally shifting, tilting and vertically adjusting said platform as needs require.

15 Claims, 9 Drawing Figures

FIG-1

MATERIAL HANDLING APPARATUS

This is a continuation of application Ser. No. 403,382, filed Oct. 4, 1973, now abandoned.

BACKGROUND OF THE INVENTION

This invention relates to improvements in material handling apparatus facilitating the transport, handling and installation of large and cumbersome articles and has particular advantage in application to the needs of the construction industry. For purpose of illustration, but not by way of limitation, the invention will be described in reference to a preferred embodiment designed to load and carry a concrete wall section to a place of use and to precisely install such wall section as and where required.

The prior art is replete with various equipment designed to assist in the handling of concrete structures. Such equipment has proven, however, to have severe limitations in use. This has been evidenced by difficulties in first loading the equipment with the difficult to handle material, difficulties in adjusting the load for proper transport, and difficulties in setting off the very heavy and unwieldy objects. As a matter of fact, in practice the loading, transport and unloading of concrete structures such as wall segments has required more than one piece of handling equipment. This has made the procedures involved not only difficult but time consuming and relatively costly.

SUMMARY OF THE INVENTION

The present invention not only provides improved means for the loading, transporting and unloading of large articles such as concrete wall segments but also adds a facility for precisely installing such articles in a required place of use.

In preferred embodiment here illustrated the invention provides framework mounting to a tractor type vehicle, which framework includes an overhead platform a forward portion of which is pivotally connected to and laterally shiftable on a vertically adjustable rod disposed intermediately of and in operative connection with vertical uprights on an axially extensible frame portion, a base for which is provided to either side of the tractor frame. Means are provided to tilt the platform to a vertical position and to raise and lower the platform in such position. The whole provides an extremely flexible and adaptable structure having a wide variety of application which eliminates the inherent dangers and problems in the handling of large and heavy objects such as a prefabricated wall segment, particularly one of concrete.

It is therefore a primary object of the invention to provide improvements in material handling apparatus particularly applicable to large and heavy objects such as those comprising a prefabricated structure.

Another object of the invention is to provide material handling apparatus facilitating the loading, transport, delivery and precise positioning of large, heavy and cumbersome articles which is economical to fabricate, more efficient and satisfactory in use, adaptable to a wide variety of applications and unlikely to malfunction.

Another object of the invention is to provide a means facilitating the handling of wall sections in the construction of a prefabricated building.

A further object of the invention is to provide material handling equipment in the nature of framework which can be applied to a mobile base to lend such base a capability of simple loading and transport of large and heavy objects and means for selectively orienting and depositing such objects in an unloading procedure.

An additional object of the invention is to provide material handling apparatus including a pivotal load carrying platform which is adjustable in several senses, rendering the apparatus extremely safe in use thereof.

Another object of the invention is to provide material handling apparatus possessing the advantageous structural features and having the inherent meritorious characteristics herein described.

With the above and other incidental objects in view as will more fully appear in the specification, the invention intended to be protected by Letter Patent consists of the features of construction, the parts and combinations thereof, and the mode of operation as hereinafter described or illustrated in the accompanying drawings, or their equivalents.

Referring to the accompanying drawings wherein is shown one but obviously not necessarily the only form of embodiment of the invention.

Like parts are indicated by similar characters of reference throughout the several views.

BRIEF DESCRIPTION OF THE ILLUSTRATED EMBODIMENT OF THE INVENTION AND AN EXEMPLARY USE

As shown in the accompanying drawings, the invention is embodied in a tractor type mobile base or vehicle 10, the chassis 12 of which is supported and conventionally powered to move on tractor type treads 14. As shown, the treads 14 move about framework 16 forming part of the tractor suspension system. Since the construction of the tractor type mobile base or vehicle 10 and the powering thereof is conventional, it need not and will not be further described except to the extent necessary for an understanding of the embodiment of the present invention.

Mounted on the chassis 12 is a driver's seat 13 to the rear of which are based vertically projected and transversely spaced posts 18 bridged at their upper ends by a U-shaped cradle 20. The latter serves to receive and nest a rear end portion of an open framework constituting a platform 22. In its nested or horizontal position the platform 22 is disposed overhead with respect to the chassis 12. Depending from the underside of a forward portion of the platform 22 are transversely spaced brackets 23 by means of which the platform is pivotally mounted on a rod 24. The rod 24 is positioned forwardly of the tractor type vehicle or mobile base 10 and supported, in a manner to be further described, between the upper ends of vertically projected posts 26 of a U-shaped frame 28. Fixed to and projected rearwardly from the base of the frame 28 is a pair of transversely spaced parallel beams 30. The beams 30 are integral with and extend rearwardly of and perpendicular to the frame 28 to be telescopically received, each respectively, in a box-like sleeve 32. The sleeves 32 are pivoted to the respectively remote outer sides of the framework 16, being located thereby outwardly of the chassis 12 and the treads 14. The rearmost ends of the sleeves 32 each receive therethrough and bear on a pivot shaft 34 projected outwardly of the adjacent face of the framework 16.

Fixed to rise from each of the outer faces of the framework 16, immediately inward and to the rear of the adjacent sleeve 32 is a plate structure 36 to the upper end of which is hinged one end of a hydraulic cylinder 38. The rod 39 in connection with the piston within the cylinder 38 projects from the opposite end of the cylinder and its projected extremity is provided with an adapter forming an eyelet 40 which receives therethrough a pivot pin 42. The latter is connected to a bracket 44 fixed to an arm projected upwardly from the upper surface of the adjacent sleeve 32, forwardly of its pivot 34. As may be seen, by conventional use of hydraulics the piston rods 39 may be retracted and extended to selectively raise and lower the sleeves 32 and thereby raise and lower the frame 28 and its associated structure. Since the hydraulic circuit and controls involved are conventional and not essential to an understanding of the present invention, they will not be further described.

Further hydraulic cylinders 48 are incorporated within the sleeves 32. In each sleeve, a cylinder 48 is positioned to the rear of and in line with the telescoped beam 30. In each sleeve 32 the cylinder 48 has one end pivotally anchored at its rearmost extremity while the cylinder piston rod 49 projects forwardly to pivotally connect to the rearmost end of the beam 30 which is contained therewith and guided in the sleeve 32. The outer side of each sleeve 32 is provided with a longitudinally extended slot 50 through which projects a bracket 52 fixed to the rear of the contained beam 30. A bar 54 extends angularly from the bracket 52 to a further bracket 56 welded or otherwise suitably fixed to the outer side of the adjacent post 26, near its upper end. It will be seen that by simultaneous and proper application of hydraulic fluid to the pistons contained in the cylinders 48 that the piston rods 49 will move in a straight line and correspondingly move the related beams 30 and consequently the whole frame 28 and its connected structure.

Fixedly connected at the forward end of each sleeve 32 and providing passage for extending and retracting movements of the telescoped beam 30 is a vertical post 58. The posts 58 are interconnected and braced at their top and bottom portions by cross beams 60 and 62 respectively. Spaced vertically at their outer sides, adjacent their lower ends, the posts 58 mount brackets 64 and 66. Pivotally connected at one end to the upper bracket 64 at the outer side of each post 58 is a hydraulic cylinder 68, the piston rod 69 of which is angled outwardly and downwardly to pivotally connect at its projected extremity to a bracket 70 fixed to the top of a stabilizing pad 72 adapted to seat to ground surface. An arm 74 pivotally connects at one end to the lower bracket 66 and at the other end to the adjacent outwardly positioned bracket 70, below and inwardly of its connection to the piston rod 69. Thus the outer sides of the posts 58 mount pads 72 which can be raised or lowered by suitable delivery of hydraulic fluid to retract and project the piston rods 69. As may be seen, the pads 72 can be seated to ground surface to stabilize the framework mounted to the tractor type vehicle 10 and to provide, if required, a means for assistance in effecting and maintaining a particular orientation of such framework.

Figure 1:
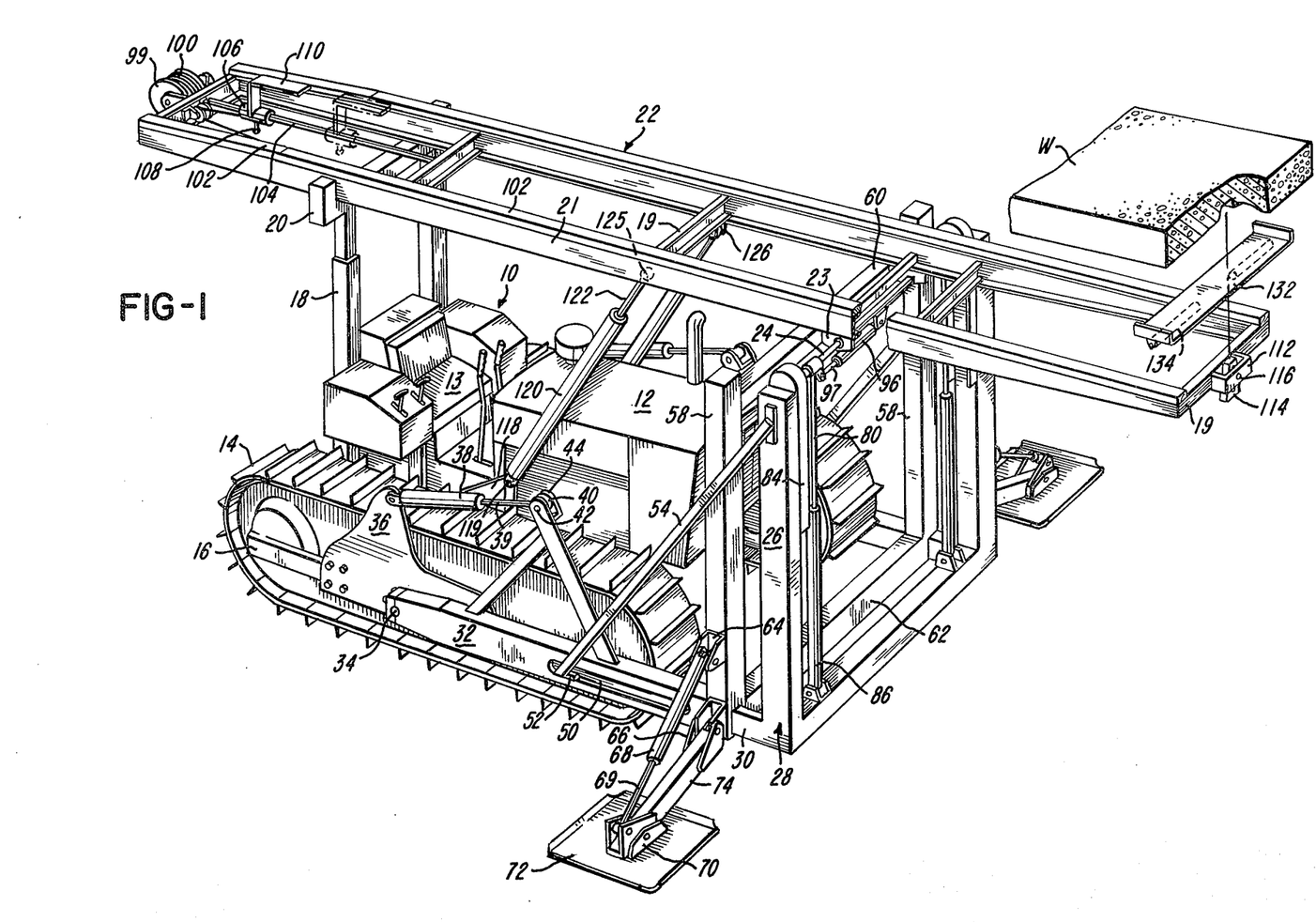
FIG. 1 is a perspective view of a tractor-type vehicle illustrating an invention embodiment.
Figure 3:
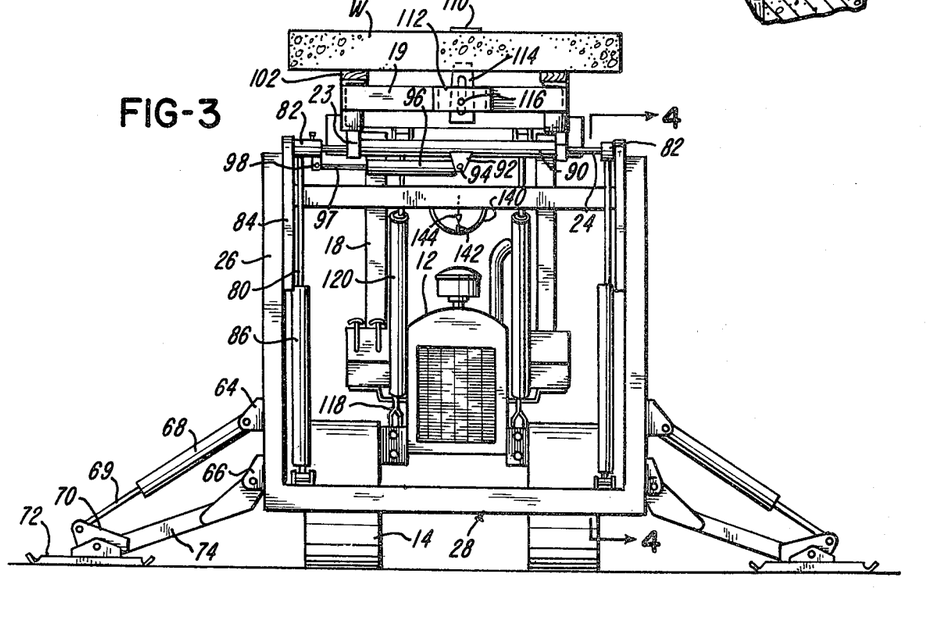
FIG. 3 is a front end view of the apparatus of FIG. 1.
Figure 4:
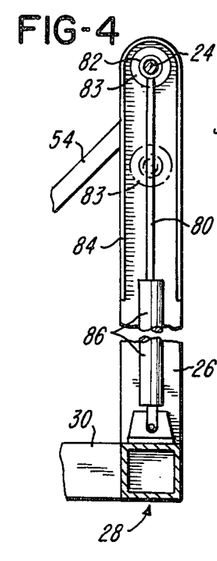
FIG. 4 is a view taken on lines 4—4 of FIG. 3.

Referring to FIGS. 1 and 3 of the drawings, it will be seen that the rod 24 is mounted on and supported by the vertically projected extremities of transversely spaced piston rods 80 which include sleeves 82 accommodating the passage therethrough of respective end portions of the rod 24. Rollers 83 are fixed on the respective extremities of the rod 24 and are projected into channels formed in guide elements 84 fixed to the facing inner sides of the posts 26. The piston rods 80 are part of hydraulic cylinders 86 the housings of which are pivotally connected to the base of the U-shaped frame 28. By reason of the guided nature of the rod 24 as defined by the rollers 83 and the guide elements 84, the hydraulic cylinders 86 project vertically from the base of the U-shaped frame 28 and in generally parallel spaced relation to the side posts 26 thereof. Obviously, fluid appropriately cycled to the respectively opposite sides of the piston heads in connection with the piston rods of the cylinders 86 will raise or lower the rod 24 and associated platform, as needs require.

It is noted here that in any instance where reference is made to the provision of fluid to control the hydraulic cylinder assemblies no particular description will be made of the related hydraulic circuits. Such is within the skill of any mechanic versed in the art and the details thereof are not essential to an understanding of the present invention. Therefore they are not described.

Positioned between the brackets 23 and about the rod 24 is a sleeve 90. Fixed to depend from the sleeve 90 is a bracket 92 to which is pivotally connected, at 94, one end of a hydraulic cylinder 96. The cylinder 96 extends parallel to the sleeve 90 and the piston rod 97 which projects therefrom extends to pivotally connect to a bracket 98 fixed to depend from a sleeve 82 which is fixed by a set screw or other suitable means to the rod 24. It will be obvious that by cycling fluid in an appropriate manner to the cylinder 96 that the degree of projection of rod 97 can be varied. This will induce, through the medium of the connection of the cylinder to the sleeve 90, a sliding on the sleeve and the bracket 23 on the rod 24. In turn, this will shift the platform 22 laterally.

A winch 99 is mounted on the end of the platform 22 which in the horizontal position of the platform projects to the rear of the vehicle 10. A cable 100 wound on and extensible from the winch is adapted to be coupled to a large heavy cumbersome article such as a concrete wall segment forming part of a prefabricated concrete building, as will be further described, to draw the same on to the platform and to a transport position. It will be noted from the drawings that the platform 22 is an open framework defined by longitudinally extending side beams 21 interconnected at longitudinally spaced intervals, including its ends, by transversely disposed brace beams 19. As may be seen from FIG. 1, the winch 99 is mounted to the rearmost brace beam 19. Further, with reference to FIG. 1 of the drawings, it may be seen that the uppermost surfaces of the side beams 21 have fixed in connection therewith strip-like elements providing slide bearing surfaces 102. Note that in the horizontal position of the platform that rearmost portions of the upper surface of the means 21 and the superposed bearing strips 102 are angularly inclined in a downward sense toward the winch. It will be seen that this facilitates the positioning of an article on the platform for transport purposes. The two rearmost braces 19 are interconnected by a fixedly mounted shaft 104 located in the central longitudinal axis of the platform 22. Mounting about and adjustable longitudinally of the shaft 104 is a sleeve-like element 106 which may be fixedly positioned by a set screw 108. Connecting to rise upwardly from the sleeve 106 and the upper surface of the platform 22 is one arm of a right angle bracket 110 the other arm of which is directed in a sense away from the winch 99. As will be seen, the right angled bracket 110 serves as a limiting and retaining device for an article loaded on the platform 22. Further provided in connection with the end of the platform 22 remote from the winch 99 is a U-shaped bracket 112 welded to the end brace bar 19 of the platform, at its outer face. There is formed thereby a sleeve, within which is positioned a vertically directed slotted latch plate 114 which is normally retracted. The latch 114 is guided for vertical movement by a pin 116 thrust through a vertical slot thereof to interconnect with the sleeve and the adjacent brace 19. The latch plate 114 can obviously be vertically projected above the upper or outermost face of the platform 22 to serve to engage and assist in retaining the object which is mounted on the platform as will be further described. Any suitable means may be provided to hold the latch 114 in its vertically projected position, for example a pin thrust through the upper portion of its vertical slot to bridge the upper edge of sleeve 112 and the adjacent brace 19. This will prevent the latch plate from withdrawing from its holding or limiting position.

Further provided in connection with the chassis 12 to either side of its engine housing is a bracket 118. Pivotally connected to each bracket 118, by way of a universal coupling 119, is a hydraulic cylinder 120. The piston rod 122 of the cylinder 120 extends to pivotally connect to a pin 124 through a universal coupling 125.

In each case, the pivot pin 124 bridges a U-shaped bracket 126 fixed to depend from the underside of one of the platform beams 21, at an intermediate position thereof spaced longitudinally to the rear of one of the brackets 23. As will be seen, by appropriate cycling of hydraulic fluid to either side of the piston heads contained within the cylinders 120, the related piston rods 122 may be appropriately extended and retracted to provide a tilting influence to the platform 22.

Now considering an application of the described structure to the purpose of loading, transporting, manipulating, and installing on site, wall segments of a prefabricated concrete building, attention is particularly directed to FIGS. 6 through 9 of the drawings. It should be noted at this point that the winch 99 will be one of conventional construction and since its application is within the skill of a mechanic, the details thereof are not and will not be particularly described except as to its normal function and operation to pay out and retract the cable 100 thereof. In practice the concrete wall segments will normally be delivered at the construction site stacked horizontally on the bed of a trailer-type truck, spacers having been provided between the adjacent of the stacked segments for their protection. To their rearmost ends will respect to the bed of the truck such wall segments W will ordinarily have apertured or other hook engaging portions in which a hook at the end of a paid out cable 100 of the winch 99 may be engaged and secured.

Figure 6:
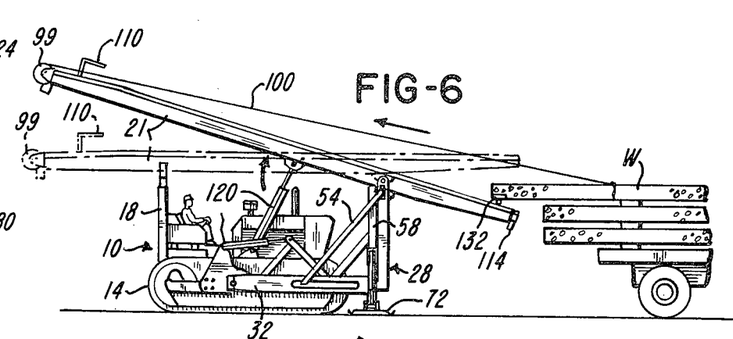
Figure 7:
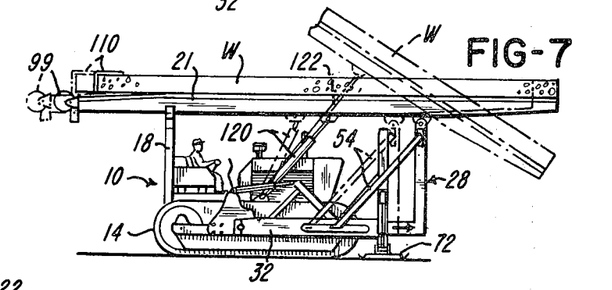
Figure 8:
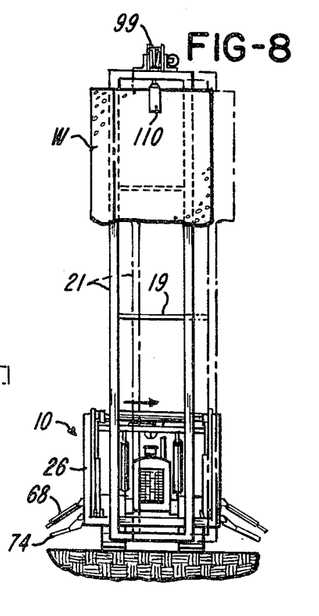

It is further contemplated that a U-shaped cradle or trolley device 132 be provided for unloading purposes to nest the rearmost end of a wall segment as it is being drawn off the truck and onto the platform 22. As is illustrated in FIGS. 1 and 6 such device is provided on its bottom with rollers 134 adapted to bear on the strip elements 102 as a wall segment to which the trolley device is applied is transferred from the truck to the platform 22.

To unload the truck the tractor-type vehicle 10 is driven by its operator to its rear to align the platform 22 with the wall segments W. At this time the platform 22 is in its horizontal or transport position. As the operator of the vehicle 10 achieves an appropriate alignment of the platform with the wall segments and moves toward a transfer position, he will actuate suitable controls to direct hydraulic fluid to achieve a projection of the rods 122 from the cylinders 120. The purpose of this is to tilt the platform 22 about the rod 24 which at this point in time is secured in fixed position. What is achieved thereby is that as the vehicle 10 is moved into transfer position the leading end of the platform 22 is relatively depressed to underlie the rear end of the wall segment W uppermost on the stack on the truck bed. Of course, the amount of tilt of the platform will be determined by the level of the wall segment to be unloaded. Also as will be obvious, the rod 24 can be raised or lowered to adjust the level of the platform as and when necessary.

The cable 100 having been hooked or otherwise secured to the uppermost wall segment W on the truck bed, the operator of the vehicle 10 will through suitable controls activate the winch 99 to wind the cable in and draw the connected wall segment W off the truck. As this occurs, the trolley device 132 is placed under the rear end of the wall segment W to have the wheels 134 thereof engage the strip bearing portions 102 on the platform member 22. As soon as load is transmitted from the rear end of the wall segment W through its cradle to the platform 22, a continued drawing in of the cable will facilitate a simple quick transfer of the wall segment from the truck and up the inclined surface of the platform 22. By actuation of appropriate hydraulic units, the operator of the vehicle 10 may gradually return the platform to a horizontal or transport position during this loading process. As the wall segment is loaded, its rear end is received in the pocket defined by the bracket 110. The bracket 110 will be suitably positioned in correspondence with the nature and length of the article which is loaded on the platform.

It is noted that for certain applications one might secure a plurality of loading winches to the platform 22 and utilize them in tandem in obvious manner.

When the wall segment is fully loaded on the platform, the depression of its rearmost end facilitates a removal of trolley 132. Also, the plate 114 may be vertically projected and fixed in a limiting position, either to engage in a recess in the loaded article or to abut the outer end thereof and thereby provide, in conjunction with the bracket 110, means to resist longitudinal movement of the loaded article in the course of transport. Once loaded, straps in connection with the platform 22, at longitudinally spaced intervals, may, if desired, be bound about the loaded article to prevent undue strain in the tilting thereof to place the same in a desired position for installation and/or use, as required.

The wall segment W can thus be simply, easily and safely loaded and caused to assume a horizontal position for transport, secured by the cable 100, the bracket 110 and the latch plate 114, together with such retaining straps as may be applied.

Of course, during the loading process the hydraulic controls available to the operator of the vehicle 10 may be operated to securely position the pads 72 to provide lateral strength to the framework constituting the invention embodiment. Both lateral and vertical stability is provided thereby.

Once the wall segment W has been loaded and positioned for transport as described, the operator can then actuate the controls for the cylinders 68 to lift the pads 72. With the elements in the position described he can then move the vehicle to the place where the wall segment W must be installed to form part of a concrete building.

Figures 5, 9:
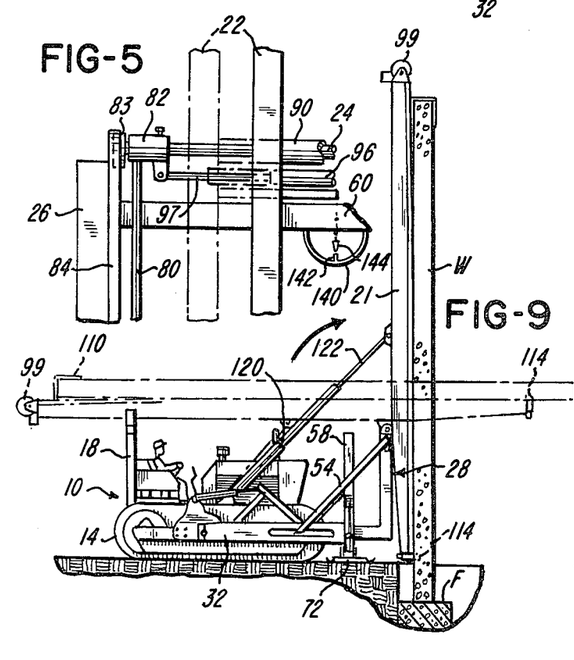
FIG. 5 is a fragmentary view illustrating details of the invention apparatus.
FIGS. 6 through 9 illustrate the various capabilities of use of the invention apparatus in loading, transport and installation of a concrete wall segment forming part of a prefabricated concrete building.

Reference is made to FIG. 9 of the drawings which reveals that prior to the time the wall segments are delivered to the construction site the necessary excavations will be made and the footer upon which the wall segments are to be vertically positioned is poured. It will be seen in FIG. 9 that the ground surface is designated by the letter G and the footer by the letter F.

For installation of the wall segment W the vehicle operator will position the vehicle 10 in a close approximation to the position required to swing the concrete wall segment W to a vertical position in which one end thereof will seat firmly to the footer F. In the example illustrated, it will be seen that in transport the end of the wall segment to seat on the footer will normally project beyond the leading end of the platform 22 sufficiently that when the wall segment is placed on the footer the retainer for latch plate 114 can be readily reached and removed. This will permit the ready separation of the platform 22 as and when required.

It will be obvious that to proceed with the installation the platform 22 must be properly oriented and constantly controlled in moving the same from its horizontal position to the vertical position required for installation of the wall segment. Attention is directed to the fact that a semi-circular loop 140 is fixed to depend from the underside of bar 60 of the invention framework, at its center. At the center or apex portion of the loop is an indicator 142. Provided in a suspended relation to the bar 60 is a pendulum 144 which on direct alignment with the indicator 142 will show that the bar 60, and correspondingly the platform 22, is in a precisely horizontal position. Such horizontal position can be achieved in setting the vehicle 10 and the mounted framework for an unloading or installing procedure by suitable balanced projection of the piston rods 69 as the pads 72 are placed on the ground surface G.

It will be obvious that with the facilities available to the operator of the vehicle 10, by reason of the framework and the hydraulic cylinders embodied therewith, that there are considerable modes and means for adjustment of the platform 22. For example, to move the platform to its vertical position about the rod 24, the rod 24 is firmly held by hydraulic fluid applied in cylinders 86 while the piston rods 122 are conventionally caused to project and to tilt the platform towards a vertical position. In the course of tilting, fluid may be directed in the cylinders 86 to retract the piston rods 80 in balanced fashion to ease the load and provide a factor facilitating the movement of the platform to a vertical position in safe and gentle fashion. If adjustments need be made for purposes of establishing a particular plane of the platform in a vertical position, one can activate the hydraulic units 48, 49 to move the beams 30 outwardly from or inwardly of the sleeves 32 to thereby properly position the frame 28. By operating the piston rods 39, further correction of the plane to be achieved by wall segment W in the vertical orientation of the platform 22 may be easily effected. As is obvious, one or any combination of the pairs of hydraulic units may be energized at any time to achieve a desired orientation of the platform and the article thereon. Where it is required to laterally shift the platform 22 to properly position a wall segment for installation, one may effect the movement of the piston rod 97 to shift the platform and its supported load laterally in one direction or the other.

Thus, the invention embodiment enables, in a simple and economical fashion, integrated means providing for a proper and balanced transfer of the wall segment W from a completely horizontal position to a completely vertical position, in the latter of which the wall segment can be properly positioned and adjusted laterally and angularly as needs require. It will of course be obvious that once the wall segment is properly positioned on the footer that on site crews can quickly and readily take over to fill in about the base of the wall segment and the footer to stabilize the wall segment in place. The invention apparatus can then be quickly disengaged and used as described to load and bring a succeeding wall segment for installation.

In disengaging the platform 22 from a wall segment, once the latch plate retainer is removed the load on the latch plate can be eased, by adjustment of the platform or otherwise, and the latch plate is retracted. The platform may then be vertically elevated to displace the bracket 110 from the wall segment W, whereupon the pads 72 having been lifted by the operator, the vehicle 10 may be moved back from its position of installation. By operation of the available hydraulic controls, the platform 22 can be returned to horizontal position and carried back to the truck for further use.

Figure 2:
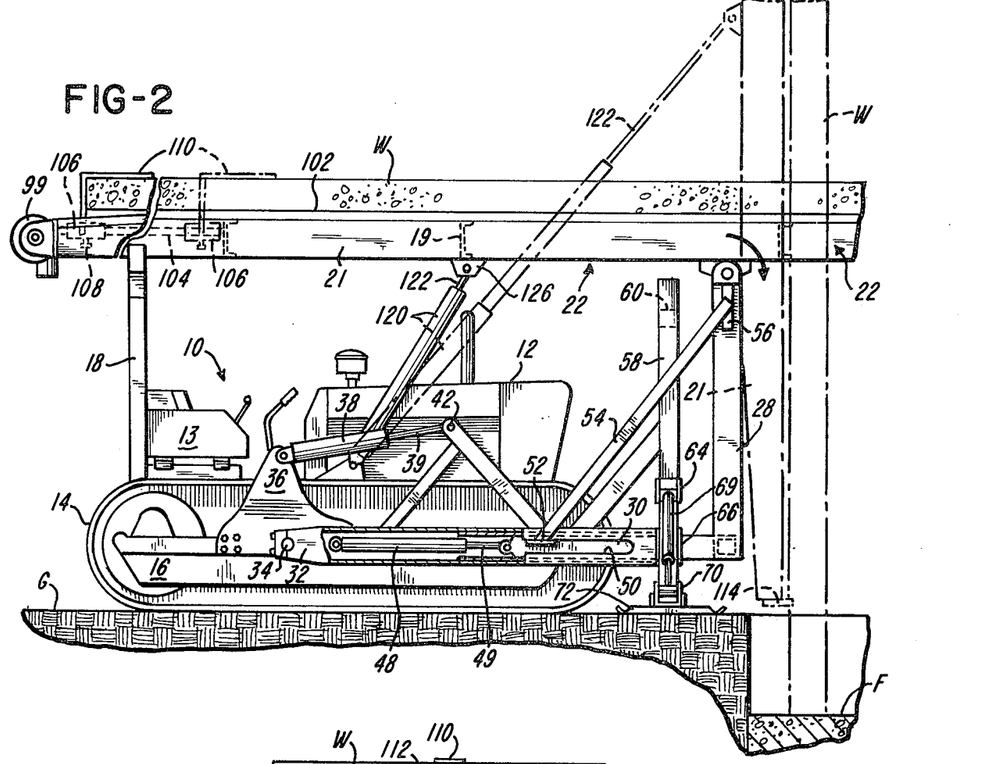
FIG. 2 is a side elevation view of the apparatus of FIG. 1.

Certain details of the invention embodiment here illustrated are shown in a generally diagrammatic fashion. For example, it will be observed from FIG. 2 of the drawings the hydraulic units 120, 122 will be of a telescoping sectional nature. Their precise detail is not set forth since the same should be obvious to those versed in the art and such details are not required to understand the essence of the invention here disclosed.

The utility and flexibility of the invention apparatus and the nature of its consolidation and integration offers obvious benefits not heretofore available. Such benefits are increasingly important as the cost of labor and the time involved in construction procedures require improvements in material handling apparatus to hold costs within reasonable limits.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

Having thus described my invention, I claim:

1. Material handling apparatus comprising a platform and means mounting said platform including a pivot means providing an axis about which said platform is movable in a pivotal sense, means for tilting such platform about said pivot means to achieve a generally horizontal position and a generally vertical position thereof and intermediate inclining positions, and different means acting respectively to adjust the position of said pivot means and thereby said platform in a longitudinal sense and in a vertical sense with reference to at least a portion of the mounting means to provide for a continuing balance of said platform and any material thereon in a tilting movement thereof from one position to another.

2. Material handling apparatus according to claim 1 characterized by said pivot means providing a base support for said platform and said platform having means in association therewith for producing a physical shift of said platform in a sense laterally of said pivot means.

3. Material handling apparatus as in claim 1, wherein said means mounting said platform includes a frame at least a portion of which is shiftable in a longitudinal sense and carries said pivot means therewith for unison motion in a longitudinal sense and guides said pivot means for relative motion in a vertical sense, and means extensible and retractable in a vertical sense supporting said pivot means and based on said frame, said frame portion and said extensible and retractable means comprising said different means for adjusting said pivot means.

4. Material handling apparatus according to claim 3, wherein said platform is supported by said pivot means to be carried therewith in the vertical and longitudinal movements of said pivot means, said platform being mounted on said pivot means to have freedom of limited relative lateral shifting motion, and having means in connection therewith for effecting such lateral shifting motion thereof.

5. Material handling apparatus comprising a platform, mounting means for said platform including a mobile base and frame means including support means spaced longitudinally of said mobile base, a portion of said support means being shiftable to extend said frame means in a sense longitudinally of said mobile base, pivot means included in said mounting means providing a support about which said platform is movable in a pivotal sense, said pivot means being mounted on said shiftable portion of said support means and having in connection therewith means for independent vertical adjustment thereof with reference to said shiftable portion of said support means.

6. Material handling apparatus as in claim 5 characterized by said shiftable portion of said support means having in connection therewith means to produce an arcuate movement thereof about pivot means in connection with said mobile base.

7. Material handling apparatus comprising a platform and means mounting said platform including pivot means accommodating the relative movement of said platform, means for moving said platform about said pivot means to achieve selective positions thereof including a generally horizontal postion and a generally vertical position, and means for adjusting the position of said pivot means, as and when needs require, said mounting means comprising a framework including a longitudinally shiftable frame section on which said pivot means is supported, said longitudinally shifting frame section including a generally vertically oriented portion projecting from which is at least one perpendicularly related arm and said mounting means including means telescopically mounting said arm and means in connection with said arm for axial shift thereof to adjust the position of said generally vertically orienting frame portion.

8. Material handling apparatus for large and heavy objects such as concrete wall segments including a mobile base, frame means spaced longitudinally of and projected upwardly from said mobile base, a portion of said frame means being axially projectible, a platform mounted on said frame means and pivotally connected to said axially projectible portion thereof and means in connection with said axially projectible portion and the means defining a pivotal connection with said platform providing for independent horizontal and vertical adjustment of the position of said pivotal connection and thereby of said platform to maintain a continuing balance thereof and any article which is mounted thereon, said axially projectible portion of said frame means including in connection therewith means to provide an arcuate movement thereof about said pivot means in connection with said base, and said means defining said pivotal connection providing thereon means for a lateral shift of said platform.

9. Material handling apparatus comprising a platform and means mounting said platform including pivot means accommodating the relative movement of said platform, means for moving such platform about said pivot means to achieve selective positions thereof including a generally horizontal position and a generally vertical position and means for adjusting the position of said pivot means and said platform to displace the same with reference to their mounting means, in at least a longitudinal sense and a vertical sense, to provide for a continuing balance of said platform and any material thereon in a movement thereof from one position to another, said means mounting said platform including a base and said adjusting means including arm means on said base including portions at least one of which is axially projectible, to which projectible portion said pivot means is mounted, said arm means having in connection therewith means for a pivoted movement thereof and means for adjusting the position of said projectible portion of said arm means to adjust the position of said pivot means and the orientation thereby of said platform.

10. Material handling apparatus comprising a platform and means mounting said platform including pivot means accommodating the relative movement of said platform, means for moving such platform about said pivot means to achieve selective positions thereof including a generally horizontal position and a generally vertical position and means for adjusting the position of said pivot means and said platform to displace the same with reference to their mounting means, in at least a longitudinal sense and a vertical sense, to provide for a continuing balance of said platform and any material thereon in a movement thereof from one position to another, said mounting means for said platform including a base, arm means pivoted to said base, means telescopically related to said arm means comprising a frame section on which is supported said pivot means and means in connection with said frame section and said arm means to provide for selective elevation and projection of said frame section in reference to said base to vary the position of said pivot means for said platform.

11. Apparatus as in claim 10 characterized by means mounting said pivot means on said frame section operable to adjust the vertical positioning of said pivot means and the orientation of said platform.

12. Material handling apparatus including a platform comprising an open framework having powered means at one end including means for coupling to and drawing a large cumbersome article such as a concrete wall segment onto said platform, means bearing on said framework to facilitate the movement of said article onto and in a sense longitudinally of said platform and means in connection with the end of said platform remote from said powered means for latching said article to said platform to maintain the position thereof in different positions of adjustment of said platform, and means mounting said platform including pivot means accommodating the relative movement of said platform, means for moving such platform about said pivot means to achieve selective positions thereof including a generally horizontal position and a generally vertical position and means for adjusting the position of said pivot means and said platform to displace the same with reference to their mounting means, in at least a longitudinal sense and a vertical sense, to provide for a continuing balance of said platform and any material thereon in a movement thereof from one position to another.

13. Material handling apparatus comprising a platform and means mounting said platform including pivot means accommodating the relative movement of said platform, said platform mounting means further including a mobile base projected from a rear end portion of which is a cradle and projected from a forward end of which is a frame to which said pivot means is mounted, said frame having in connection therewith means for establishing a predetermined orientation thereof and to displace the same in a longitudinal sense when said predetermined orientation thereof is established, means for moving said platform about said pivot means to achieve selective positions thereof including a generally horizontal position and a generally vertical position, said means for moving said platform about said pivot means having a pivotal connection to means in connection with said base and a pivotal connection to said platform and including portions operable to tilt said platform from said cradle and about said pivot means, and means for adjusting the position of said pivot means and said platform to displace the same with reference to their mounting means, in at least a longitudinal sense and a vertical sense, to provide a continuing balance of said platform and any material thereon in a movement thereof from one position to another, said adjusting means including means for raising or lowering said pivot means in reference to said base simultaneous with the tilting of said platform about said pivot means.

14. Material handling apparatus comprising a platform, means mounting said platform including pivot means accommodating the relative movement of said platform, means for moving said platform about said pivot means to achieve selective positions thereof including a generally horizontal position and a generally vertical position, and means for adjusting the position of said pivot means as and when needs require, said mounting means including a mobile base projected from a rear end of which is a cradle and projected from a forward end of which is a frame contributing to the support of said pivot means, said means for moving said platform about said pivot means having a pivotal connection at one end thereof to means in connection with said base and a pivotal connection at the remote end thereof to said platform and including portions operable to tilt said platform from said cradle and about said pivot means, and said adjusting means including means for lowering said pivot means in reference to said base simultaneous with the tilting of the platform and means providing a mount for said pivot means providing for displacement of said pivot means in a sense longitudinally of said base.

15. Material handling apparatus comprising a platform, means mounting said platform including pivot means accommodating the relative movement of said platform, means for moving said platform about said pivot means to achieve selective positions thereof including a generally horizontal position and a generally vertical position, and means for adjusting the position of said pivot means as and when needs require, said mounting means including a mobile base projected from a rear end of which is a cradle and projected from a forward end of which is a frame contributing to the support of said pivot means, said means for moving said platform about said pivot means having a pivotal connection at one end thereof to means in connection with said base and a pivotal connection at the remote end thereof to said platform and including portions operable to tilt said platform from said cradle and about said pivot means, and said adjusting means including means for producing an arcuate movement of said pivot means in reference to said base.

* * * * *

UNITED STATES PATENT AND TRADEMARK OFFICE
CERTIFICATE OF CORRECTION

PATENT NO. : 3,954,189
DATED : May 4, 1976
INVENTOR(S) : Gail Sherritt

It is certified that error appears in the above—identified patent and that said Letters Patent are hereby corrected as shown below:

Column 4, line 46, "bracket" should be corrected to read -- brackets --.

Column 5, line 66, "will" should be corrected to read -- with --.

Signed and Sealed this

Seventeenth Day of August 1976

[SEAL]

Attest:

RUTH C. MASON
*Attesting Officer*

C. MARSHALL DANN
*Commissioner of Patents and Trademarks*